United States Patent [19]

Horwitz et al.

[11] Patent Number: 4,835,107

[45] Date of Patent: May 30, 1989

[54] METHOD FOR THE CONCENTRATION AND SEPARATION OF ACTINIDES FROM BIOLOGICAL AND ENVIRONMENTAL SAMPLES

[75] Inventors: E. Philip Horwitz, Naperville, Ill.; Mark L. Dietz, Tucson, Ariz.

[73] Assignee: Arch Development Corp., Chicago, Ill.

[21] Appl. No.: 921,282

[22] Filed: Oct. 21, 1986

[51] Int. Cl.[4] .................... G01N 33/20; G01N 30/02; B01D 11/00

[52] U.S. Cl. .......................... 436/82; 423/9; 422/70; 436/175; 436/161; 424/9

[58] Field of Search .............. 423/9; 424/2, 9, 10; 436/175, 82, 161, 172; 422/70; 210/635, 502.1, 656

[56] References Cited

U.S. PATENT DOCUMENTS

| | | | |
|---|---|---|---|
| 4,162,230 | 7/1979 | Horwitz et al. | 423/9 |
| 4,548,790 | 10/1985 | Horwitz et al. | 423/9 |
| 4,574,072 | 3/1986 | Horwitz et al. | 423/9 |

OTHER PUBLICATIONS

N. A. Talvitie, Radiochemical Determination of Plutonium in Environmental and Biological Samples by Ion Exchange, Nov. 1971, pp. 1827–1830.

C. W. Sill et al., Simultaneous Determination of Alpha-Emitting Nuclides of Radium through Californium in Large Environmental and Biological Samples, Jul., 1979, pp. 1307–1314.

*Primary Examiner*—Barry S. Richman
*Assistant Examiner*—Lyle Alfandary-Alexander
*Attorney, Agent, or Firm*—Michael D. Rechtin; Philip P. Mann

[57] ABSTRACT

A method and apparatus for the quantitative recover of actinide values from biological and environmental sample by passing appropriately prepared samples in a mineral acid solution through a separation column of a dialkyl(phenyl)-N,N-dialylcarbamoylmethylphosphine oxide dissolved in tri-n-butyl phosphate on an inert substrate which selectively extracts the actinide values. The actinide values can be eluted either as a group or individually and their presence quantitatively detected by alpha counting.

19 Claims, 2 Drawing Sheets

SEQUENTIAL SEPARATIONS ON ABBEX COLUMNS

| STEP | REAGENT |
|---|---|
| LOAD | 1 TO 7 $\underline{M}$ $HNO_3$ |
| WASH No.1 | 1 $\underline{M}$ $HNO_3$ |
| WASH No.2 | 6 $\underline{M}$ HCl |
| STRIP | REAGENT |
| Am, Cm | 3 $\underline{M}$ HCl |
| Th | 1 $\underline{M}$ HCl |
| Pu | 0.5 $\underline{M}$ HCl−0.1 $\underline{M}$ ASCORBIC ACID |
| Np | 0.5 $\underline{M}$ HCl−0.1 $\underline{M}$ HF |
| U | 0.1 $\underline{M}$ $NH_4HC_2O_4$ |

METHOD FOR THE CONCENTRATION AND SEPARATION OF ACTINIDES FROM BIOLOGICAL AND ENVIRONMENTAL SAMPLES

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

The invention is related to a method and apparatus for the concentration and separation of actinide values from samples containing these and other elements. More specifically, the invention relates to a method and apparatus for the quantitative recovery of antinide values from biological and environmental samples. Still more specifically, the invention relates to a method for the quantitative recovery and detection of actinide values from biological samples such as urine, blood and feces and from enviromental samples such as soil and water and to an apparatus for accomplishing the same.

The wide-scale use of nuclear technology, both in power production and in the manufacture of nuclear weapons, necessitates the periodic monitoring of biological and environmental samples for the presence of selected antinide elements; e.g. Th, U, Np, Pu, Am and Cm. The most common types of samples assayed are urine and fecal material. Recent world events such as the power reactor explosion at Chernobyl in the USSR, point up the need for quick, effective and accurate methods for monitoring environmental samples of soil and water to determine the degree of distribution and concentration of the actinide elements, as a group and individually.

A number of procedures for the determination of the actinide plutonium in urine are disclosed in Mikrochimica Acta 1978 1, pages 79 to 88. As discussed therein, procedures for the preconcentration of extremely small amounts of Pu (about $10^{-11}$–$10^{-12}$g) from the vast excess of matrix substances present in urine samples include: precipitation reactions, absorption on glass fibre, extraction, extraction chromatogrophy and ion exchange. Of these, the precipitation reactions provides the most economical results.

As described in the article, the present method for recovering Pu from urine samples requires the addition of nitric acid and a small amount of calcium ions and phosphoric acid to the sample which is then heated for about 3 hours to digest the proteinaceous material normally found in urine, releasing the Pu. Concentrated ammonia solution is then added to co-precipitate calcium phosphate and the Pu. The precipitate is then dissolved in $HNO_3$ and evaporated to dryness several times to wet-ash any remaining organic matter. Solid sodium nitrite and nitric acid are added to this residue and the mixture is heated to prepare a nitric acid sample solution suitable for anion exchange. After passing the sample solution through the anion exchange column to recover the Pu, the column is washed several times before the Pu eluted with a dilute HCl/HF solution. Following evaporation to dryness, the residue is dissolved in an appropriate solution and the Pu is electrodeposited. The alpha count is then obtained to determine the quantity of Pu present.

From the above, it is obvious that the Pu recovery process is complex, time consuming and expensive. While the process will also recover Np and Th, it will not recover other actinides, if present. Furthermore, recovery of the various actinides individually is difficult should the detection of each actinide be desired.

Also needed is a method for the quantitative analysis of actinide values which may be found in water and soil samples which is quick, accurate and relatively inexpensive.

U.S. Pat. No. 4,548,790 dated Oct. 22, 1985 describes a group of neutral bifunctional organophosphorous compounds broadly described as alkyl(phenyl)-N,N-dialkylcarbamoylmethylphosphine oxides (hereinafter referred to as CMPO) which are useful for the recovery of actinide and lanthanide values from acidic solutions containing these and other metal values. The combination of the CMPO extractants with a phase modifier such as tri-n-butyl phosphate (hereinafter referred to as TBP) in a normal paraffin hydrocarbon diluent (NPH) diluent is described in U.S. Pat. No. 4,574,072, dated Mar. 4, 1986. Both patents are assigned to the common assignee and are incorporated herein by reference.

SUMMARY OF THE INVENTION

A method and apparatus has been developed for the isolation and separation of actinide values, which is applicable to a wide range of biological and environmental samples which utilized this new group of extractants. The method is relatively rapid, highly sepcific, and flexible in regard to the number and selection of actinides which can be isolated.

The method of the invention, for quantitatively detecting actinide values which may be present in biological or environmental samples, comprises treating the sample, if necessary, to concentrate and release the actinide values, forming an acidic sample solution containing the actinide values, passing the sample solution through a separation column of a CMPO in TBP on an inert substrate, whereby the actinides are taken up by the separation column, passing an ammonium oxalate solution through the column to elute the actinide elements, and detecting the presence and quantity of the actinide elements. This method is being referred to as ABBEX (actinide bioassay bifunctional extraction).

By the selection of eluents, it is possible to separately elute the various actinide values from the column so that each element can be quantitatively determined.

The separation column of the invention has an upper, open-topped cylindrical portion for receiving the solutions, a tubular body portion containing an inert porous support material on which is absorbed CMPO diluted in TBP for separating the actinides from the sample solutions and a funnel-shaped lower portion having a lower opening for draining the solutions from the column.

The method of the invention is suitable for the quantitative recovery of actinides from biological samples such as urine, feces and blood and from environmental samples such as water and soil. The essential difference in the method between the various samples is in the preparation of the sample to facilitate actinide recovery.

It is therefore one object of the invention to provide a method for the quantitative recovery of actinide values for biological and environmental sources. It is another object of the invention to provide a method for the quantitative recovery of actinides from biological and environmental samples in which the actinide values can be recovered separately. It is still another object of the invention to provide a method for the quantitative recovery of actinide values from biological samples such as urine, feces, and blood. Finally, it is the object of the invention to quantitatively recovery actinide values from environment samples such as soil and water.

DETAILED DESCRIPTION OF THE DRAWINGS

DETAILED DESCRIPTION OF THE PREFERRED EMBODIMENT

Figure 1:
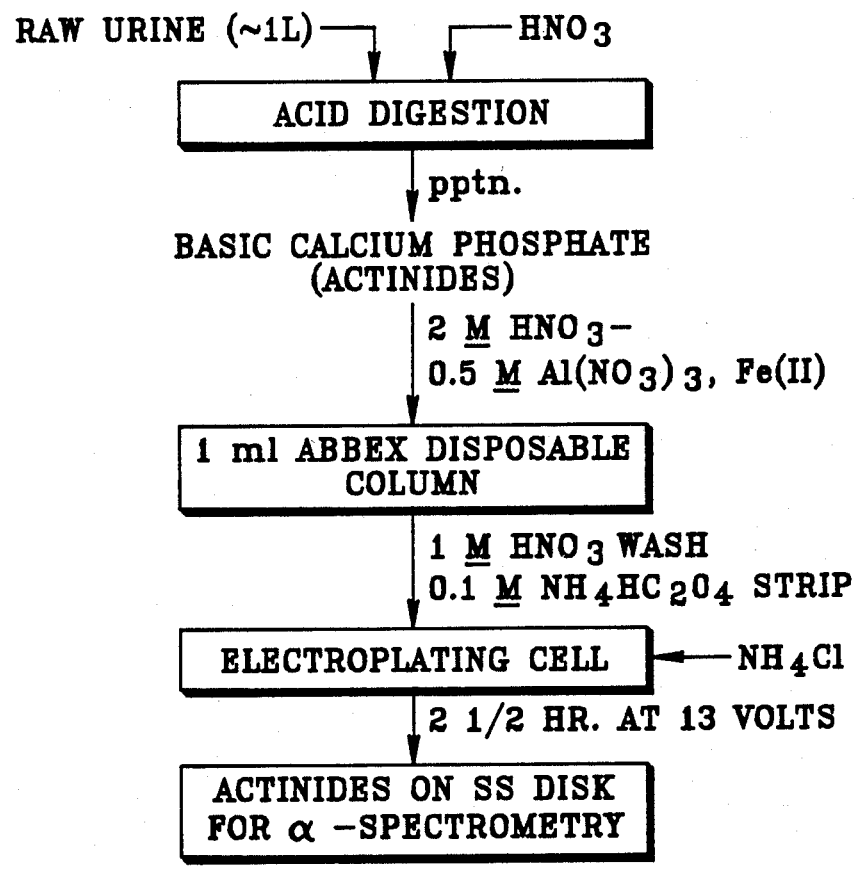
FIG. 1 is a flow diagram of the method of the invention for the separation of actinide values from urine.

These and other objects of the invention, for quantitatively detecting actinide values present in a sample, consists of preparing the sample to concentrate and release the actinide. The manner in which a sample is prepared will depend upon the sample under study and will be discribed in detail below. For example, a 600 ml urine sample, is made about 1.6M in nitric acid and about 50 grams of calcium ion and about 1 ml of concentrated phosphoric acid are added to form a digestion solution. The solution is heated for about 3 hours at just below boiling temperature to destroy any protein or cellular material in the sample and release the actinides. To this solution is added about 100 ml of concentrated ammonium hydroxide to form monobasic calcium phosphate which precipitates out, carrying with it the actinide values in the sample. After separation the precipitate is dissolved in sufficient nitric acid to form an acid solution of at least 1.0M. This solution is made 0.5M in aluminum nitrate and about 0.5 ml of 0.1M ferrous nitrate is added to reduce any Np(V) to Np(IV), forming an acidic sample solution. The acidic sample solution is then passed through a separation column of 0.75M octyl(phenyl)-N, N-diisobutylcarbamoylmethylphosphine oxide dissolved in tri-n-butyl phosphate on an inert substrate whereby the actinides are selectively taken up by the separation column, passing a 1M $HNO_3$ wash solution through the column to remove other values from the column, passing an 0.1M ammonium hydrogen oxalate strip solution through the column to elute the actinide values from the column, adding sufficient ammonium chloride to the eluent to form an electrolytic solution, passing a current through the solution to electrodeposit the actinide values, and detecting the presence and quantity of actinide values with an alpha spectrometer.

Alternatively, actinide values can be quantitataively recovered from urine samples without the precipitation step. The sample is first acidified to from 1.0 to 2.0M preferably 1.6M, in nitric acid and heated for about 3 hours to digest any protein on cellular material. The digested sample is then acidified to at least 1M in $HNO_3$ or 6M in HCl and the acid solution is passed through a pre-column of the inert substrate material without the extractant. The precolumn adsorbs material from the urine, which would otherwise plug the separation column, preventing the flow of the sample solution through the column. The purified acidified urine sample can then be passed through the separation column where the actinides are taken up. A pre-column bed size of 20 ml together with a separation column of 20 ml, is sufficient for a urine sample of 600 ml.

The digested sample solution may be acidified with a strong mineral acid which may be from about 1.0 to 10.0M in $HNO_3$ or from about 6.0 to 12.0M in HCl. Solutions below 1.0M in nitric acid or 6.0M in HCl will not load the actinides onto the separation column.

The aluminum nitrate in the acidic solution may range from about 0.01 to 0.5M, preferably 0.1M. Although not absolutely necessary, the aluminum nitrate provides for better absorption of the tri-valent Cm and Am values on the column from the acidic solution.

The ferrous nitrate is added in an amount sufficient to reduce any Np(V) to Np(IV). Generally, about 0.5 ml of a 0.1M Fe(II) nitrate solution is sufficient for a 600 ml urine sample.

The preferred CMPO is octyl(phenyl)N,N-disobutylcarbamoylmethylphosphine oxide (hereinafter referred to as O$\phi$D(iB)CMPO) which has been dissolved in TBP, although any of the CMPO extractants described in the before mentioned patent will be satisfactory. Preferabley, the TBP contains from 0.5 to 1.0M O$\phi$D-(iB)CMPO, most preferably about 0.75M. The inert support material may be any hydrophobic chromatographic support material such as Amberlite ® XAD-4, 7 or 16, silica gel, Porasil ® or Zorbax Sil ®. The mesh size of the support may range from 50 to 500 mesh preferably about 100 to 125 mesh.

Figures 2, 3:
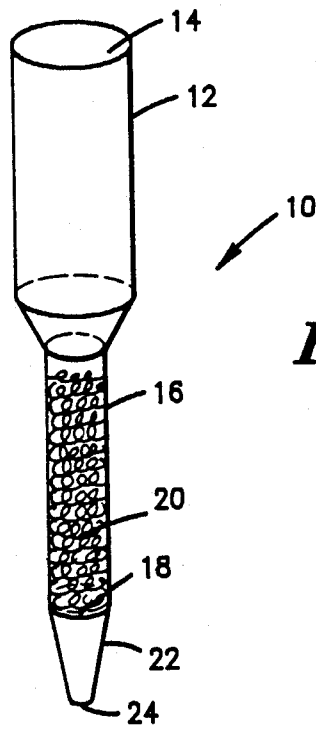
FIG. 2 is a diagram of the method of the invention for the sequential separation of the actinide values from the separation column.
FIG. 3 is a drawing of the apparatus of the invention.

Referring now to FIG. 3, the separation column 10 of the invention consists of a cylindrical portion 12 having an open top 14 for receiving the sample solutions, a central tubular-shaped body portion 16 having a lower porous plug 18 for supporting the support material, the body portion containing inert porous support material 20 on which is adsorbed a CMPO diluted in TBP for extracting the actinide values from the solution and other values, and a funnel-shaped bottom portion 22 having an outlet 24 for draining the solutions from the column A column which have been found satisfactory for the recovery of actinides from urine samples as prepared above, has a bed volume of about 1 ml.

One advantage of the method and apparatus of the invention is that the various actinides can be eluted separately from the extraction column and recovered individually. As shown in the flow diagram of FIG. 3, the extraction column is loaded with the actinide values by passing the acidic sample solution through the column. A first wash of several bed volumes of 1M $HNO_3$ followed by a second wash of several bed volumes of 6M HCl will remove essentially all non-actinide elements. A third wash of several bed volumes of 3M HCl will strip Am and Cm values from the column. This is followed by several volumes of 1M HCl to strip the Th. The Pu is stripped with a solution of 0.5M HCl containing 0.1M ascorbic acid while a solution of 0.5M HCl and 0.1M HF brings down the Np. A final solution of 0.1M ammonium oxalate strips the remaining uranium values. The various fractions can then be electrodeposited and counted with an alpha spectrometer.

Alternatively, sequential separation can also be accomplished by placing a second column before the CMPO column. This column containing tricaprylmethylammonium chloride sorbed on a inert substrate. This column will remove the tetravalent actinides such as Th, Pu and Np, which are stripped with 6M HCl, 6M HCl-1.0M hydroquinone, and 0.5M HCl-0.1M HF respectively. The original load and wash from this column is used to feed the CMPO column where the uranium and trivalent actinides are absorbed. The trivalent actinides are stripped with 2M HCl while the uranium is stripped with 0.1M ammonium hydrogen oxalate. The various fractions can then be electrodeposited and counted as described herein after.

Sample size will depend upon the biological or environmental sample being tested but must contain sufficient actinide values to come within the detection limits. For example, a 0.6 to 1.0 liter urine specimen is sufficient as is a 200 gm fecal specimen. A water sample may be from 0.5 to 1 liter while a 100–500 gm soil sample should suffice.

Pretreatment of the sample for actinide recovery will, as stated before, depend upon the source of the sample. The preparation of a urine sample has been described in detail. A fecal sample must first be dried, for example, at 500° C. in a muffle furnace, to form an ash which is mostly calcium phosphate. This ash in then dissolved in about 10 ml of 2M $HNO_3$ and 0.5M aluminum nitrate, to which the Fe(II) ion is added to form the acidic sample solution. A water sample is acidified with nitric or hydrochloric acid to the proper concentration and passed through the separation column. Alternatively, the water sample could be evaporated to reduce the volume before acidifying and column contact. Preparation of a soil sample would involve treatment with an acid, such as nitric or hydrochloric containing a small amount of HF to solubilize the actinides and dissolve silicon. The resulting mixture is then filtered and a small amount of aluminum nitrate is added to complex any fluoride ion remaining and the acidic solution is passed through the separation column as in the case of a urine or fecal sample.

Detection of the actinides is best done by an alpha spectrometer. Preferably a small amount of an electrolyte, such has ammonium chloride, is added to the eluent and a current passed through the solution to deposit the actinides on a stainless steel disk. Alternatively, the eluent can be evaporated and an alpha count of reduced accuracy made of the residue.

The following examples are given to illustrate the method of the invention and are not to be taken or limiting the scope fo the invention as defined by the appended claims.

ABBEX COLUMN PREPARATION

Unpurified Amberlite® XAD-7, 100-120 mesh was soaked in distilled water over night. The material was slurried in water, allowed to settle in a column and washed several times in distilled water followed by several washes in methanol until the wash was clear of cloudiness. All traces of methanol are then removed.

Coating

Each 10 g of purified, dried XAD-7 resin requires 6.86 ml of 0.75M O$\phi$D(iB)CMPO in TBP to produce an approximately 90% coating (based on porosity). The 0.75M O$\phi$D(iB)CMPO in TBP was prepared by disolving 3.06 g of O$\phi$D(iB)CMPO in TBP and diluting to 10.0 ml. The 6.9 ml of O$\phi$D(iB)CMPO/TBP solution was dissolved in 50 ml of methanol and added to a slurry of 10 g of purified XAD-7 in 50-100 ml of methanol. The mixture was gently heated and stirred to evaporate off the methanol while suspending the resin. When it became a paste, it was removed from the heat and pumped down in a vacuum desiccator at room temperature equipped with a solvent trap to remove the last traces of methanol until constant weight was reached. The dried, coated material is a grainy, fee-flowing powder.

EXAMPLE I

About 0.4 g of the O$\phi$D(iB)CMPO/TBP-coated XAD-7 resin was loaded as an aqueous slurry into a 9" disposable glass Pasteur pipet (0.5 cm I.D.) fitted with a small glass wool plug. After settling (resin depth 5 cm), the resin was covered with 3–5 mm depth of glass beads (diameter 0.2 mm). The column, which was fitted with a plastic funnel as a reservoir, was then conditioned by passing through it the following solutions (in the given order):

(1) 0.1M $NH_4HC_2O_4$, * 20 ml
(2) 2 M $HNO_3$, * 35 ml
(3) 2 M $HNO_3$-0.5M $Al(NO_3)_3$, * 5–10 ml.

Prior to the actual column separation step, the actinides are co-precipitated as a group on a basic calcium phosphate precipitate (containing $\geq$ 50 mg Ca) by neutralizing a nitric acid-digested urine to which $Ca^{2+}$ and $PO_4^{3-}$ have been added with $NH_4OH$. The precipitated basic calcium phosphate was separated from the urine solution (by decantation and centrifugation) and then dissolved in nitric acid and ahsed to destroy organic material. The ashed calcium phosphate residue was dissolved in 10 ml of 2M $HNO_3$-0.5M $Al(NO_3)_3$ with gentle heating. In order to reduce Np(V) to Np(IV), about 0.5 ml of 0.1M Fe(II)nitrate solution (in dilute $HNO_3$ with hydrazinium and hydroxylammonium nitrate stabilizers) is added. After 10–15 minutes, this feed solution (10.5 ml) was passed through the O$\phi$C(iB)CMP/TBP/XAD-7 column toextract the nitrate complexes of (III)-(IV)- and (VI)-valent actinides. Two-2 ml rinses with 2M $HNO_3$ 0.5M $Al(NO_3)_3$ were successively added to the column. Two-2 ml washes with 1M $HNO_3$ serve to wash $Ca^{2+}$ and $Al^{3+}$ salts (nn-absorbed) out of the column as well as to remove any absorbed Fe(III) from the column. (Normally, a faint yellow color from weakly absorbed Fe(III) due to air oxidation of the added Fe(III) appears in the upper half on the column. This disppears quickly with the first portion of the 1M $HNO_3$ wash. The appearance of a bright yellow color duing the feed loading step indicates considerable oxidation of the Fe(II) to Fe(III). This latter condition may be accompanied by loss of column efficiency due to the uptake of Fe(III) and failure to reduce Np(V) to Np(IV).) The extracted actinides were stripped from the column by eluting with 10 ml of 0.1M $NH_4HC_2O_4$. This strip solution is collected directly in an electroplating cell. After the addition of 2.5 ml of 5 M $NH_4Cl$ electrolyte, the actinides were electrodeposited onto a polished stainless stell disk (cathode) by passing a current (initially 0.8–0.9 amperes at 13 V) with a Pt wire-loop anode for 2.5 hours.

Tests for the entire procedure were conducted with a mixed tracer solution of $^{236}U$, $^{237}NP$, $^{239}Pu$ and $^{244}Cm$ (about 3–6 dpm of each nuclide) added to 600 ml portions of various different urine specimens. The final electrodeposited samples were assayed for these nuclides by high resolution alpha spectroscopy with semiconductor detectors of known efficiency. The average recoveries of each nuclide from 12 replicates are presented in the following table:

TABLE I

| Nuclide | Alpha-Particle Energy (MeV) | Percentage Recovery[a] |
|---|---|---|
| $^{236}U$ | 4.49 | 85 ± 6 |
| $^{237}Np$ | 4.7 (average) | 85 ± 12 |
| $^{239}Pu$ | 5.15 | 86 ± 6 |

TABLE I-continued

| Nuclide | Alpha-Particle Energy (MeV) | Percentage Recovery[a] |
|---------|------------------------------|-------------------------|
| $^{244}$Cm | 5.71 | 86 ± 6 |

[a]Average of three sets of four samples each. Uncertainties are standard deviations of the data distributions. Lowest recovery: 50% ($^{237}$Np); highest recovery: 98% ($^{239}$Pu).

As can be seen from the preceeding discussion and Example, the method and appartus of the invention provide a quick, effective, accurate and inexpensive method and apparatus for the quantitative determination of actinides in biological and environmental samples.

The embodiments of this invention in which an exclusive property or priviledge is claimed are defined as follows:

1. A method for quantitatively detecting actinide elements which may be present in a biological or environmental sample comprising:
   treating the sample to concentrate and release the actinides,
   forming an acidic sample solution containing the actinides,
   passing the acidic sample solution through a separation column of an alkyl(pheny)-N,N-diakylcarbamoylmethylphosphine oxide in tri-n-butyl phosphate coated and dried onto an inert substrate whereby the actinides are selectively taken up by the separation column,
   passing an ammonium oxalate solution thru the column to elute the actinite elements, and
   detecting the presence and quantity of the actinide elements.

2. The method of claim 1 wherein the biological or environmental sample is selected from the group consisting of urine, feces, soil and water.

3. The method of claim 2 wherein the sample is urine, and the sample treating and acidic solution forming steps comprise: making the sample at least 1.0M in nitric acid,
   heating the sample to a temperature and for a period of time sufficient to digest any protein and cellular material, forming a digested sample,
   adding a strong mineral acid to the digested sample to make the sample at least 1.0M in acid forming an acid solution,
   passing the acid solution through a pre-column consisting of a hydrophobic chromatographic support material which removes some of the proteinaceous material from the acid solution, and
   adding sufficient ferrous nitrate to the acid solution to reduce and Np(V) to Np(IV) thereby forming the acidic sample solution.

4. The method of claim 2 wherein the sample is water, and the sample treating and acidic solution forming steps comprise: adding sufficient strong mineral acid to the sample to form a solution at least 1.0M in acid,
   adding sufficient ferrous nitrate to the acid solution to reduce any Np(V) to Np(IV) thereby forming the acidic sample solution.

5. The method of claim 4 wherein the separation column consists of from about 0.5 to 1.0M octyl(phenyl)-N,N-diisobutylcarbamoylmethylphosphine oxide dissolved in tri-n-butyl phosphate coated and dried onto an inert substrate.

6. The method of claim 4 wherein the inert substrate material is a hydrophobic chromatographic support material.

7. The method of claim 2 wherein the sample is a feces, and the sample treating and acidic solution forming steps comprise: heating said sample in a furnace to a temperature and for a time sufficient to dry the sample and form an ash containing the actinides,
   dissolving the ash in a concentrated mineral acid to form a solution at least 1.0M. in acid, and adding sufficient ferrous nitrate to the solution to reduce any Np(V) to Np(IV), thereby forming the acidic sample solution.

8. The method of claim 7 wherein the separation column consists of from about 0.5 to 1.0M octyl(phenyl)-N,N-diisobutylcarbamoylmethylphosphine oxide dissolved in tri-n-butyl phosphate coated and dried onto an inert substrate.

9. The method of claim 8 wherein the inert substrate material is a hydrophobic chromatographic support material.

10. The method of claim 2 wherein the sample is soil, and the sample treating and acidic solution forming steps comprise: mixing the sample with a strong mineral acid containing HF for a period of time sufficient to solubilize the actinides and dissolve any silicon present, forming an acid mixture,
    filtering the mixture to separate the soil from the acid,
    adding sufficient ferrous nitrate to the acid to reduce any Np(V) to Np(IV) thereby forming the acidic sample solution.

11. The method of claim 10 wherein the separation column consists of from about 0.5 to 1.0M octyl(phenyl)-N,N-diisobutylcarbamoylmethylphosphine oxide dissolved in tri-n-butyl phosphate coated and dried onto an inert substrate.

12. The method of claim 11 wherein the inert substrate material is a hdyrophobic chromatographic support material.

13. The method of claim 2 wherein the sample is urine, and the sample treating and acidic solution forming steps comprise: adding a strong mineral acid to the sample to make the sample at least 1.0M in acid, forming an acid solution,
    adding sufficient calcium ion and phosphate to the acid solution to form a digestion solution,
    heating the digestion solution to a temperature sufficient and for a time sufficient to destroy the protein and cellular material in the sample and release the actinides,
    adding sufficient ammonium hydroxide to the digestion solution to form calcium phosphate which precipitates out of the digestion solution together with the actinides,
    separating the calcium phosphate and actinides from the solution,
    dissolving the calcium phosphate the actinide precipitates in concentrated mineral acid to form a solution at least 1.0M in acid; and
    adding sufficient ferrous nitrate to the acid solution to reduce any Np(V) to Np(IV) thereby forming the acidic sample solution.

14. The method of claim 13 wherein the separation column consists of from about 0.5 to 1.0M octyl(pheny)-N,N-diisobutylcarbamoylmethylphosphine oxide dissolved in tri-n-butyl phosphate coated and dried onto an inert substrate.

15. The method of claim 14 wherein the inert substrate material is a hydrophobic chromatographic support material.

16. A method for quantitatively detecting the various actinide elements which may be present in a biological or environmental sample comprising:
   treating the sample to concentrate and release the actinide,
   forming a strong mineral acid solution containing the actinides, said solution being at least 1.0M in acid,
   adding ferrous nitrate to the acid solution to reduce and Np(V) to Np(IV) thereby forming an acidic sample solution,
   passing the acidic sample solution through a separation column of an alkyl(phenyl)-N,N-dialkylcarbamoylmethylphosphine oxide dissoved in tri-n-butyl phosphate coated and dried thereon an inert substrate whereby the actinide are selectively taken up by the separation column,
   passing 1.0 to 3.0M HCl solution through the column to elute any Am and Cm values from the column,
   passing 0.5 to 1.5M HCl solution through the column to elute any Th values from the column,
   passing 0.5M HCl solution containing 0.1M asorbic acid through the column to elute any Pu values from the column,
   passing 0.5M HCl solution containing 0.1M HF through the column to elute any Np values,
   passing 0.1M ammonium oxalate solution through the column to elute the U values from the column, and
   detecting the presence and quantity of each actinide.

17. A separation column for recovering actinides from acidic solutions prepared from biological and environmental samples comprising:
   a tubular-shaped body portion having an open top for receiving the acid solutions and a lower outlet,
   a porous hydrophobic chromatographic material packed within the body portion having coated and dried thereon an actinide extractant sorbed thereon, the actinide extractant consisting of an alkyl(phenyl)-N,N-dialkylcarbamylmethylphosphine oxide dissolved in tri-n-butyl phosphate.

18. The separation column of claim 17 wherein the extractant is octyl(pheny)-N,N-diisoutylcarbamylmethylphosphine oxide dissolved in tri-n-butyl phosphate.

19. The separation column of claim 18 wherein the tri-n-butyl phosphate is from 0.5 to 1.0M in octyl(phenyl)-N,N-diisobutylcarbamylmethylphosphine oxide.

* * * * *